United States Patent [19]
Thompson, III

[11] Patent Number: 6,111,963
[45] Date of Patent: Aug. 29, 2000

[54] ELECTRONIC VEHICULAR AUDIO PLAYBACK SYSTEM

[76] Inventor: William H Thompson, III, 214 N. Wanamaker St., Philadelphia, Pa. 19139

[21] Appl. No.: 08/933,847

[22] Filed: Sep. 19, 1997

[51] Int. Cl.$^7$ ...................................................... H04B 3/00
[52] U.S. Cl. ................................ 381/77; 340/692; 381/86
[58] Field of Search ................................ 381/77, 82, 86, 381/85, 78, 79; 340/692

[56] References Cited

U.S. PATENT DOCUMENTS 4,713,648  12/1987  McSweeney ............................ 340/692
4,755,789   7/1988  Paschal .................................. 340/692

*Primary Examiner*—Minsun Oh Harvey

[57] ABSTRACT

Intended for use in law enforcement vehicles; an invention composed of a medium to store and means to playback, through a speaker, audio message reminders concerning responsibilities, proper conduct, protection of personal and citizens rights and esprit de corps.

The invention contains control circuitry so that the announcements are timed to prompt an optimum response from the officers.

8 Claims, 5 Drawing Sheets

ELECTRONIC VEHICULAR AUDIO PLAYBACK SYSTEM

FIELD OF INVENTION

This invention relates to an exclusively vehicular electronic digitized audio storage, control and playback only means. Composed of sequential messages in direct analog storage, using electrically erasable programmable read only memory technology. Playback of said messages is controlled as to provide optimum playback timing for the maximum benefit of the officers in the vehicle.

BACKGROUND OF INVENTION

Law enforcement officers are highly trained professionals that are frequently required to work in highly stressful often potentially dangerous situations. The insight and skills to guide them through the myriad situations they encounter is due to the formal training they received.

Police officers are subject to emotional responses to both stressful and routine encounters with the public. An emotional response by a police officer is potentially damaging to the police officers immediate effort to enforce the law, the citizens personal safety and civil rights, as well as the officers personal safety. Also, it opens up the prospect of possible civil and or criminal litigation against the police officer and or the department and city or county governments. The loss of the case and cost of fighting citizen complaints, all because the officer might have simply acted emotionally is a tragedy. Jury awards can cause such situations to become extremely expensive misadventures.

The invention, by use of controlled, brief announcements attempts to prevent a potentially emotional response through purposefully timed sequenced messages. Said messages, to avoid being repetitious are limited to intervals of not more than once in a five minute period, and occur when the ignition switch is first turned on, and subsequently when the vehicles transmission lever is moved in either direction away from reverse. Said messages relate pride in their particular department, advisements concerning their professional conduct, words of caution about personal safety and public accountability. The invention attempts to be a constant advocate to the police officer. The intent of the invention is to encourage officer awareness that they are not alone.

SUMMARY OF THE INVENTION

It is an object of the present invention to provide a small sized, self contained audio playback system. A further object of the invention is that it plays sequential messages. Additionally, the invention is intended for but not limited to the law enforcement community.

In accordance with the present invention playback occurs when the vehicles ignition switch is initially turned on and subsequently when the transmission selector is moved in either direction from reverse gear; providing a five minute period had elapsed from the previous message.

DESCRIPTION OF THE DRAWINGS

The form, purpose and advantages will be more fully understood from the following description of a preferred embodiment shown by way of example in the attendant drawings.

DESCRIPTION OF PREFERRED EMBODIMENT

Figure 1:
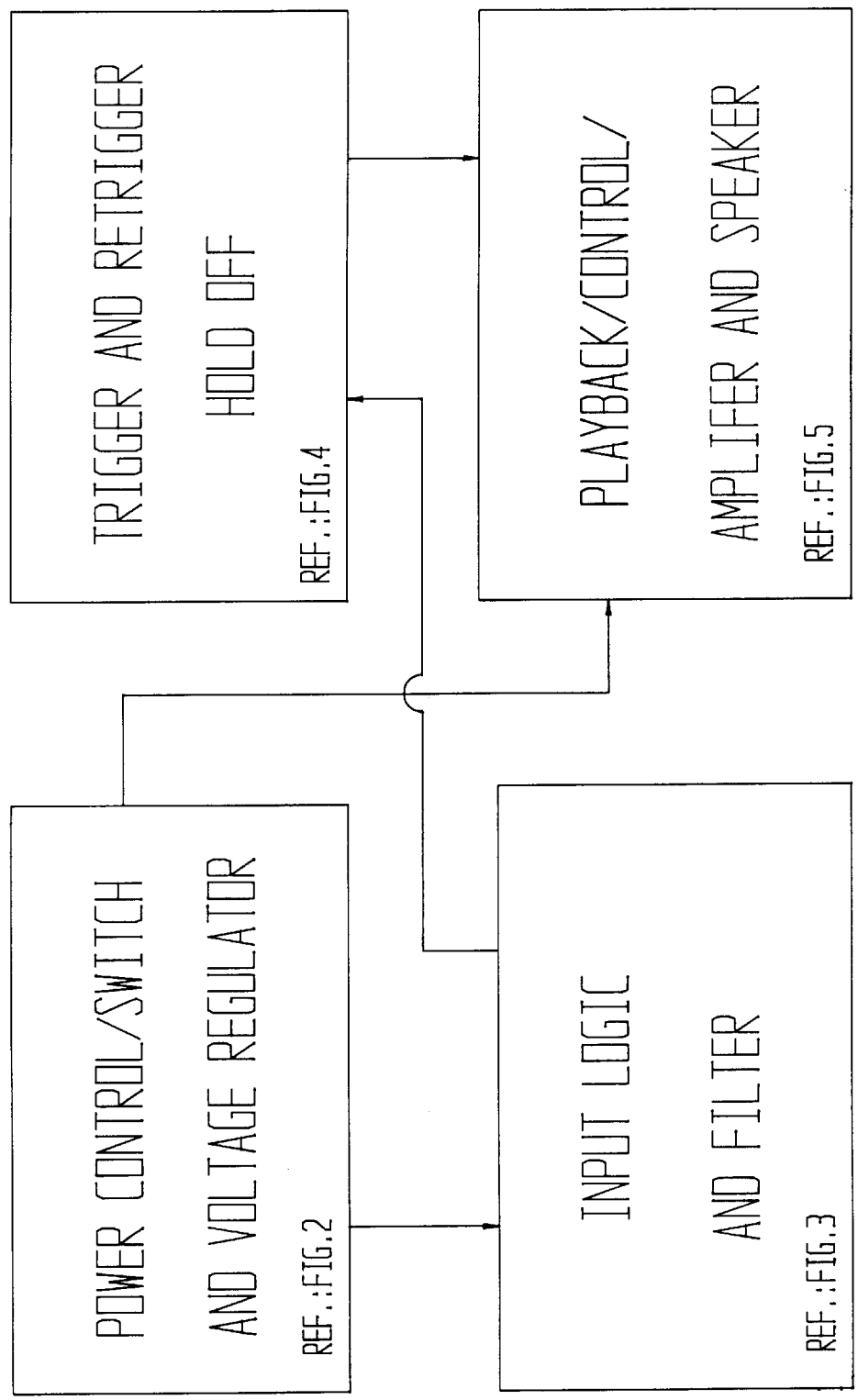
FIG. 1 is a block diagram showing the power control/switch and voltage regulator, input logic and filter circuitry, trigger and retrigger holdoff circuitry and playback/control/amplifier and speaker in accordance with the present invention.
Figure 2:
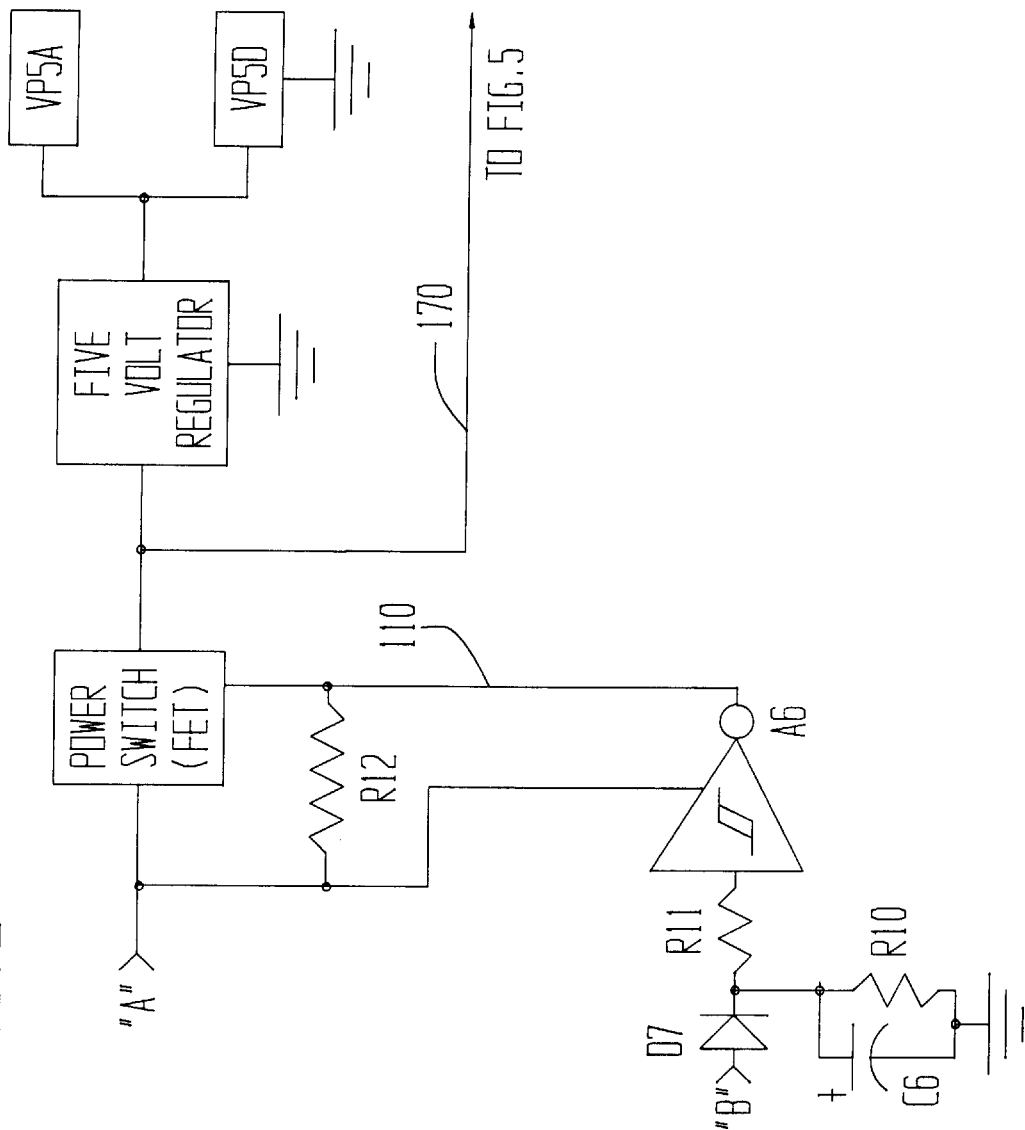
FIG. 2 is a schematic diagram of the power control/switch and voltage regulator circuit of the invention.

FIG. 1. shows a block diagram of an electronic vehicular audio playback system in accordance with the invention 1. Reference FIG. 2. The sleep, power up and idle operating states of the invention 1 is as follows: electrode "A" is connected to an always on source of vehicle battery voltage, +12–14 V.D.C., which connects to the input of a F.E.T. "P" channel power switch, PS1. and also supplies operating power for inverter A6. Electrode "B" is connected to the throw side of the vehicle's ignition switch, and connects to the anode of diode, D7. Said switch is in the off position. C7 is discharged, therefore R10 establishes a ground referenced, logical low at the input of inverter A6, therefore the output of A6 is a logical high. The output of A6 is tied to the gate of PS1 and input resistor R12, therefore power switch, PS1, is non-conductive. This represents the invention 1 in the micro-power, sleep mode.

When the vehicles ignition switch is turned on the invention 1 is as follows: Electrode "B" is at battery potential of +12–14 V.D.C. C7 charges through D7, establishing a logical high through gate protection resistor R11 at the input of inverter A6. Whose output switches low, turning on PS1.

The invention 1 is now functional and will remain in said mode for 30 minutes after the ignition switch is off. This is due to the time constant of C7 times R10 maintaining a high on A6 input. D7 at this time is reversed biased, isolating C7, except for R10.

The purpose of the preceding power control circuit is to prevent excessive power consumption from the vehicle and also encourage the playing of all of the messages in the playback system, as when the invention 1, is in the sleep mode it starts from the first message when awakened.

The output of PS1, 170, is connected to the positive power lead of audio power amplifier A7, and the input of linear regulator, VR1, the output of said regulator is +5VDC, divided, and separately filtered to become identified as VP5A and VP5D. All of the inventions 1 power circuits are returned through ground. Further activity of the invention 1 after power up is described as follows: Reference FIG. 3, Schmitt input devices are used at A1 thru A6 and NG1 thru NG4 because of their high noise immunity and tolerance of slow inputs. NG3, identified as a dual input NAND GATE has one input, 30, tied to the junction of C5 and R9. The remaining lead of C5 is grounded and of R9 returned to VP5D, the time constant of C5 times R9 is 0.3 seconds. Therefore, for a finite period of time after VP5D is present, input 30 will be a logical low at NG3, said low is translated to PB1 to produce an initial message at power up.

Figure 4:
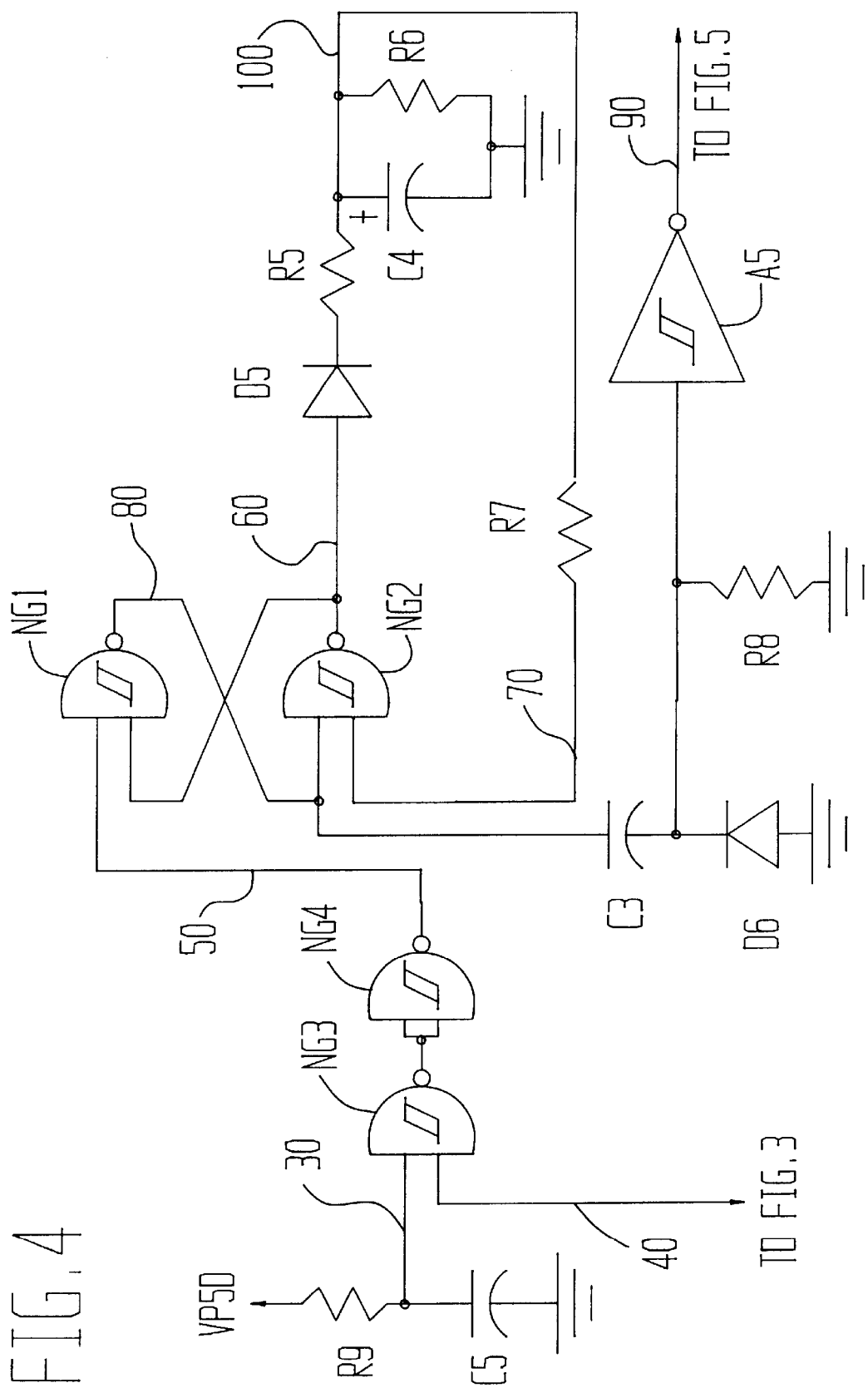
FIG. 4 is a schematic diagram of the trigger and retrigger holdoff circuit of the invention.

Reference FIG. 4, identified as comprising a cross coupled, dual input NAND GATE latch is item NG1 and NG2. Said gates are triggered by sources from 30 and 40, and gated through NG3 and inverted by NG4. Reference 30, following power up, C5 is at a logical low, translated to 50, and is applied to one input of NG1. Discharged electrolytic capacitor C4 in parallel with timing bleed down resistor R6 represents a logical low at 100, which is coupled through gate protection resistor R7 to one input of NG2 at 70. Thus, 60 is a logical high, said output is connected to the anode of diode D5, the cathode of said diode is tied to current limiter resistor R5 therefore capacitor C4 charges to a logical high in approximately 70 ms., through D5 and R5. 50, at power up, is pulsed low for 160 ms. thus 80 is high. After the level at 70 reaches a logic high NG2 output switches low, latching NG1 and NG2 in the inventions 1 retrigger holdoff mode, which is until C4 discharges to a logic low, approximately 240 seconds, reference 100. The input at 50 is now high. When 70 becomes low NG2 output switches high. NG1, with both inputs high, it's output switches low, NG1 and NG2 are now latched in the ready to trigger mode.

The playback portion of the invention 1 requires a low going trigger to initiate the playing of a message. Said trigger is a function of the following circuit. Capacitor C3 is connected to 80, which is quiescently low. The remaining lead of C3 is tied to the junction of diode D6 cathode, resistor R8 and the input of inverter A5. R8 establishes a ground referenced low at inverter A5, therefore 90, the output of A5, is a logical high.

Figure 5:
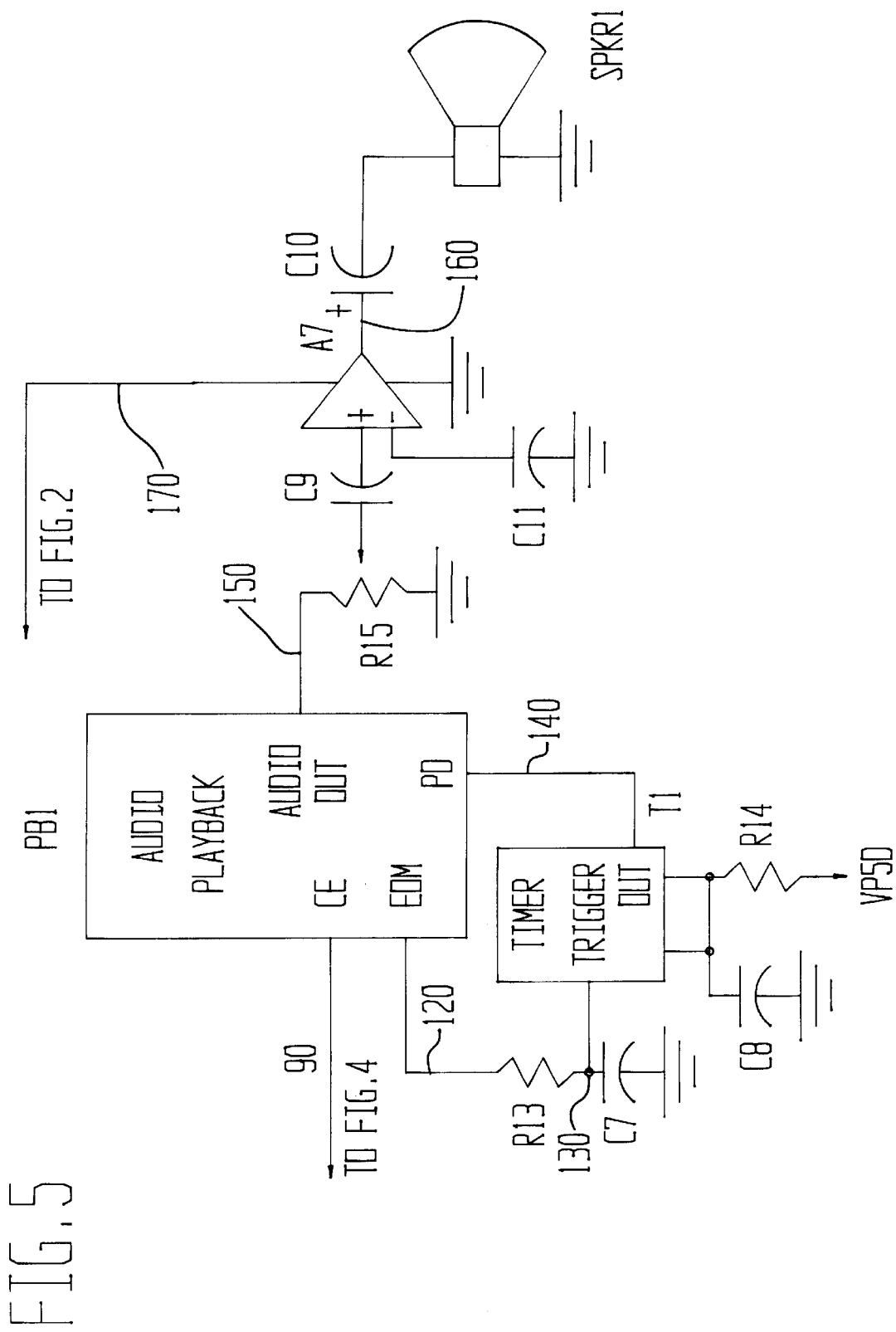
FIG. 5 is a schematic diagram of the audio storage/playback control/amplifier and speaker circuit of the invention.

Reference FIG. 5, the inventions 1 audio storage/playback control and amplifier circuit. Audio messages are stored in the invention 1 in a device identified as PB1. The device is capable of sequentially playing back messages. Additionally, said device uses advanced EEPROM technology to store analog signals directly into digital memory. The device greatly simplifies circuit requirements.

END OF MESSAGE, identified as 120, a control signal output of PB1 is active low. Said signal is pulsed low to mark the end of a message and remains low when the playback device reaches the end of it's memory. END OF MESSAGE is normally high. Capacitor C7 charges through resistor R13 to the high at END OF MESSAGE 120. The trigger input of playback POWER DOWN reset timer, identified as T1, is connected to the junction of resistor R13 and capacitor C7. T1 is activated when it's trigger voltage drops below one-third VP5D. The time constant of R13 and C7 is long enough that the charge on C7 will not drop to one-third VP5D except when PB1 reaches the end of it's memory. When said end of memory condition occurs, the voltage across C7 will decay below one-third of VP5D, at which point the output of timer, T1, pulses high. Said output pulse is identified as POWER DOWN RESET, ref. 140. The pulse duration is determined by the value of capacitor C8 and resistor R14. Said POWER DOWN RESET pulse resets PB1 to the beginning of it's memory.

The following describes the functions of the invention 1, at playback. Reference FIG. 2. electrode "A" is connected to an always on source of vehicle battery voltage. When the ignition switch is turned "ON", vehicle battery voltage is applied to electrode "C". Reference FIG. 3, as previously described a low pulse is generated at 50. This sets NG1, and NG2 in the triggered mode. NG1 switches high causing C3 to charge through R8, generating a high across said resistor. A5 squares and inverts the high pulse on R8, developing the required low going trigger needed to activate PB1.

When the retrigger holdoff circuit times out, after the playing of the first message in PB1 following power up, the circuit is ready to retrigger. Reference FIG. 2, the invention 1 is now ready to retrigger, the transmission of the vehicle is placed in reverse. Electrode "B" is now at the vehicle's battery voltage 12–14 VDC, which is not compatible with the invention's 1 five volt operating requirements. Diode D1. serves to clamp the input level to VP5D plus a diode drop, through current limiting resistor R1. The diode drop across D2 ensures a high at 10 compatible with the inventions 1 requirements. Capacitor C1 charges through resistor R3 to 10 potential, thus A1's input switches to a logic high as C1 charges. Inverters A1 and A2 are coupled in cascade, thus the output of A2 follows the input of A1. Therefore, D3 becomes reversed biased. The high at 10 causes A4 to switch to a low.

When the vehicles transmission selector is moved away from the reverse position, 10 immediately becomes a logical low. Therefore, A4 switches high. The time constant of resistor R3 and capacitor C1 maintains the input of A1, high for the time required to deliver a high pulse of proper width at 20. Resistor R4 and capacitor C2 form a low pass filter. The high at 20 couples to the input of A3, driving 40 low until C1 discharges to A1's switch point.

Figure 3:
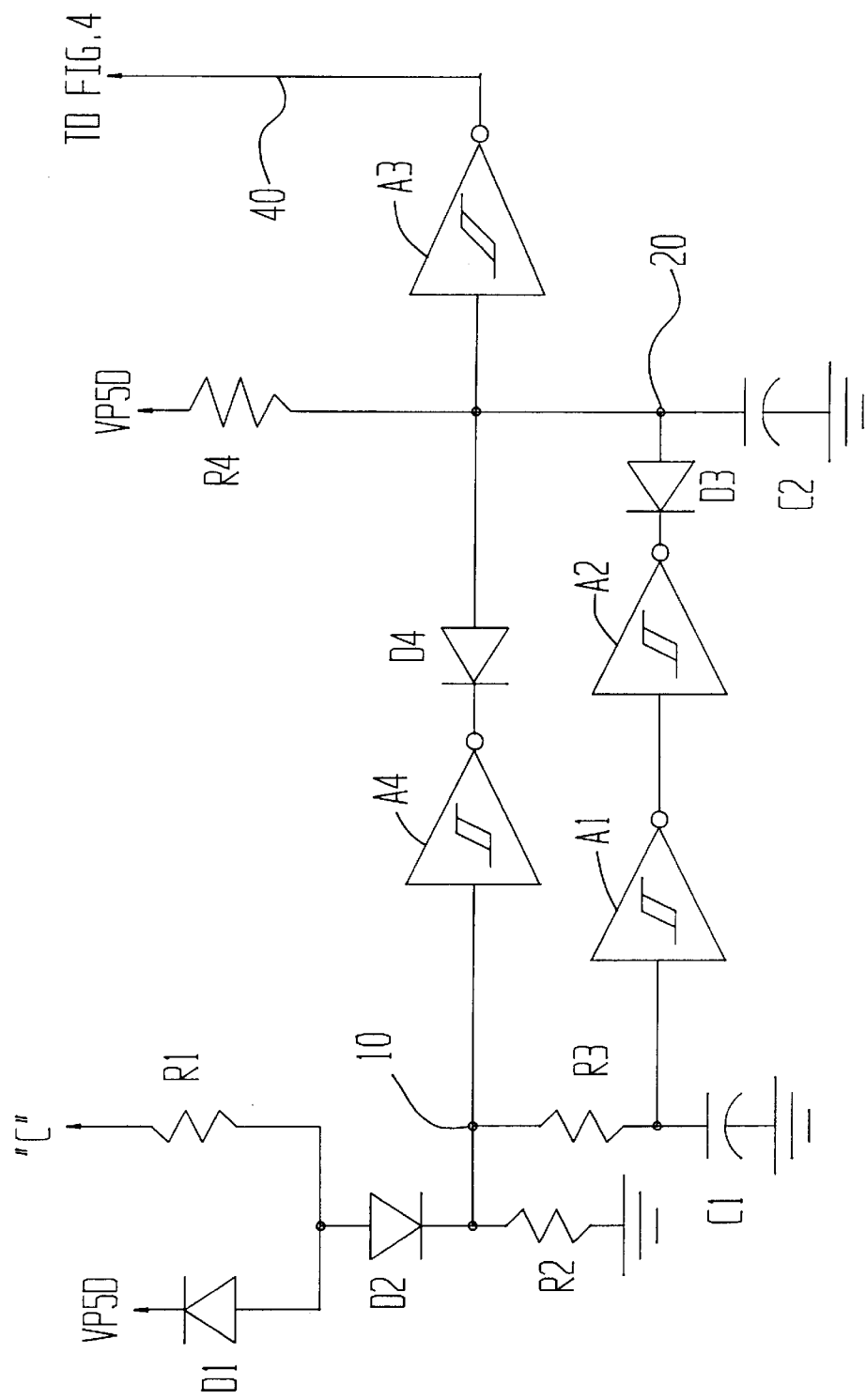
FIG. 3 is a schematic diagram of the input logic and filter circuit of the invention.

Reference FIG. 3, 40 is connected to one input of NG3 and when it pulses low, functions similarly as described when 30 is low at power up, to generate the next message in the series of messages stored in PB1. Reference FIG. 5. as described previously, when 90 pulses low PB1 initiates the playing of a message. Audio output from PB1 is applied to the high end of a volume control, potentiometer R15, 150. Capacitor C9 is connected between the wiper of R15 and the non-inverting input of audio power amplifier A7. Capacitor C11 bypasses the unused inverting input. The output of A7 is 160. Audio energy is coupled through output capacitor C10 to speaker, SPK1, to produce the inventions 1 audio messages.

While the invention 1, has been described in a preferred embodiment, it is understood that various additions, substitutions and changes in the form and detail can be effected by those skilled in the art with out departing in any way from the spirit of the invention.

What I claim is:

1. An electronic audio playback apparatus for playing back at controlled intervals, sequenced audio messages in a motor vehicle, comprising:
   a power control/switch and voltage regulator circuit to selectively supply operating power and a regulated voltage;
   an input logic and filter circuit, to receive input signals, process and filter said signals, said input logic and filter circuit providing an output signal;
   a trigger and retrigger holdoff circuit, connected to receive output signal from said input logic and filter circuit, to provide an output signal and suppress any additional said output signals for a finite period of time;
   an audio storage playback/control/amplifier and speaker to receive an input trigger from said trigger and retrigger holdoff circuit to initiate the playing of an audio message, with a controlled playback format, amplified and connected to a speaker to produce said audio message.

2. The apparatus of claim 1 wherein said power control/switch and voltage regulator circuit contains a diode connected to an electrode the other end of of said diode connected to a junction of a capacitor and two resistors; the remaining ends of first said resistor and capacitor being grounded and the second said resistor being tied to the Schmitt input of a CMOS inverter; the output of said inverter being tied to the gate input of a field effect transistor power switch, and a resistor; the source electrode of said power switch and remaining lead of said resistor connected to the source power input electrode; the output of said power switch connected to the input of a five volt linear regulator and power input lead of an audio power amplifier.

3. The apparatus of claim 1 wherein said input logic and filter circuit comprise a diode connected to the circuits power source and the remaining lead of said diode tied to the junction of a second diode and a first resistor; the remaining lead of said resistor terminated at an electrode; the remaining end of said second diode tied to a second and third resistor, and input of a first inverter; the remaining lead of first said resistor being grounded and second said resistor connected to the junction of a capacitor and input of a second inverter, the remaining lead of said capacitor being grounded; the output of first said inverter tied to a third diode and the output of second inverter connected to the input of a third inverter; the output of third said inverter is tied to a fourth diode; the remaining leads of said third and fourth diodes are tied to a fourth resistor, a second capacitor and input of a fourth inverter; the remaining end of said fourth resistor is connected to the circuit power source and said second capacitor is grounded.

4. The apparatus of claim 3 wherein the output of said fourth inverter is connected to a gate input of said trigger and retrigger holdoff circuit.

5. The apparatus of claim 1 wherein said trigger and retrigger holdoff circuit consists of a first resistor connected to the circuit power source, the other end of said resistor connected to a first capacitor and one input of a first two input NAND gate; the other end of said capacitor being grounded; the remaining input of said NAND gate connected to output of said input logic and filter circuit; the output of said first NAND gate is tied to both inputs of a second dual input NAND gate; the output of said NAND gate is tied to one input of a third two input NAND gate; the output of said NAND gate is connected to one input of a fourth dual input NAND gate and a second capacitor; the output of said fourth NAND gate is tied to the remaining input of said third NAND gate and a first diode; the remaining end of said diode is tied to the junction of a third and fourth resistor and a third capacitor, the other end of said capacitor and said third resistor being grounded; and the other end of said fourth resistor is connected to the remaining input of said fourth NAND gate.

6. The apparatus of claim 5, said trigger and retrigger holdoff circuit, wherein the remaining lead of said second capacitor is connected to the junction of a fifth resistor a second diode and the input of a first inverter; the remaining leads of said resistor and diode being grounded; and the output of said inverter constitutes the output of said trigger and retrigger holdoff circuit.

7. The apparatus of claim 1 wherein said audio storage playback/control/amplifier and speaker circuit consists of: a direct audio storage in electrically erasable programmable read only memory and playback device; connected to said device 'END OF MESSAGE' signal, a first resistor; the remaining end of said resistor is connected to the junction of a first capacitor and the TRIGGER input of a timer device, the other end of said capacitor being grounded; the output of said timer connected to the POWER DOWN input of said audio storage/playback device; a first potentiometer high end connected to an AUDIO OUT terminal of said audio storage/playback device; said potentiometer low end being grounded and the wiper of said potentiometer connected to a second capacitor; the remaining end of said capacitor connected to the input of an audio power amplifier; the output of said audio power amplifier connected to a third capacitor; the remaining lead of said capacitor connected to a first speaker and the remaining lead of said speaker being grounded.

8. The apparatus of claim 5 wherein said trigger and retrigger holdoff circuit provides a trigger to said audio storage playback/control/amplifier circuit; said trigger is connected to CHIP ENABLE input of said audio storage and playback device.

\* \* \* \* \*